(12) United States Patent
Son et al.

(10) Patent No.: US 11,613,000 B2
(45) Date of Patent: *Mar. 28, 2023

(54) ROBOT

(71) Applicant: LG ELECTRONICS INC., Seoul (KR)

(72) Inventors: Jungkyu Son, Seoul (KR); Jinsu Kim, Seoul (KR); Boyeon Kim, Seoul (KR); Hyesun Lee, Seoul (KR); Bina Kim, Seoul (KR); Mina Suh, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 500 days.

This patent is subject to a terminal disclaimer.

(21) Appl. No.: 16/802,915

(22) Filed: Feb. 27, 2020

(65) Prior Publication Data

US 2021/0138631 A1    May 13, 2021

(30) Foreign Application Priority Data

Nov. 8, 2019   (KR) .......................... 10-2019-0142963

(51) Int. Cl.
| | | |
|---|---|---|
| *B25J 19/02* | (2006.01) | |
| *B25J 5/00* | (2006.01) | |
| *B25J 9/16* | (2006.01) | |
| *B25J 9/00* | (2006.01) | |
| *A61G 5/10* | (2006.01) | |

(Continued)

(52) U.S. Cl.
CPC ............. *B25J 5/007* (2013.01); *B25J 9/0009* (2013.01); *B25J 9/161* (2013.01); *B25J 19/02* (2013.01); *A61G 5/04* (2013.01); *A61G 5/10* (2013.01); *B25J 11/009* (2013.01)

(58) Field of Classification Search
CPC . B25J 9/0009; B25J 19/02; B25J 9/161; B25J 5/007; B25J 11/009; A61G 5/125; A61G 5/1067; A61G 5/128; A61G 5/04; A61G 5/10

See application file for complete search history.

(56) References Cited

U.S. PATENT DOCUMENTS

| | | | |
|---|---|---|---|
| 6,917,854 B2 * | 7/2005 | Bayer ................... | G05D 1/0261 401/23 |
| 11,154,442 B1 * | 10/2021 | Dean ........................ | A61G 5/10 |

(Continued)

FOREIGN PATENT DOCUMENTS

KR    10-2013-0119582 A    11/2013

OTHER PUBLICATIONS

Ikeda et al., Autonomous Step Climbing Strategy Using a Wheelchair and Care Robot, 2019, IEEE, p. 75-80 (Year: 2019).*

(Continued)

*Primary Examiner* — McDieunel Marc
(74) *Attorney, Agent, or Firm* — Birch, Stewart, Kolasch & Birch, LLP

(57) ABSTRACT

Provided is a robot including a main body including a traveling wheel, an accessory mounting portion and an opening, the opening being spaced apart from the accessory mounting portion, a rear sensor which is accommodated in the opening and facing a rear of the robot to sense outside of the main body, and an accessory including a mounter mounted on the accessory mounting portion and a supporter for supporting an article.

19 Claims, 12 Drawing Sheets

(51) Int. Cl.
*A61G 5/04* (2013.01)
*B25J 11/00* (2006.01)

(56) References Cited

U.S. PATENT DOCUMENTS 11,351,073 B2 * 6/2022 Son .......................... A61G 5/04
2020/0237590 A1 * 7/2020 Choi ........................ A61G 5/04

OTHER PUBLICATIONS

Ikeda et al., Stable Step Climbing and Descending for Tandem Wheelchairs Connected by a Passive Link, 2007, IEEE, p. 1345-1350 (Year: 2007).*

Ikeda et al., , Step moving for an electric wheelchair using a robot programmable over the intranet, 2013, IEEE, p. 791-797 (Year: 2013).*

Nakjima, Evaluation of the Mobility Performance of a Personal Mobility Vehicle for Steps, 2017, IEEE, p. 9748-9756 (Year: 2017).*

* cited by examiner

ROBOT

CROSS-REFERENCE TO RELATED APPLICATIONS

This application claims the benefit of priority to Korean Patent Application No. 10-2019-0142963, filed on Nov. 8, 2019 in the Korean Intellectual Property Office, the disclosure of which is incorporated herein by reference in its entirety.

FIELD OF THE DISCLOSURE

The present invention relates to a robot.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

In recent years, there has been a trend of increasing in number of guidance robots, which provide a variety of guidance services at the airport, government offices, etc., a transport robot for transporting goods, or a boarding robot on which the user boards.

An example of a robot capable of carrying an article may be an intelligent caddy robot disclosed in Korea Patent Publication No. 10-2013-0119582 (Published on Nov. 1, 2013). The intelligent caddy robot includes a vehicle body constituted by a supporter disposed on an upper portion thereof to stably support golf equipment and a wheel disposed on a lower portion thereof to drive the robot. The supporter disposed on the upper portion of the vehicle body may be foldable to the vehicle body so as to be easily carried.

SUMMARY

Embodiments provide a robot that is capable of sensing surrounds of a sensor with high reliability with disturbing the sensing of the sensor.

Embodiments also provide a robot in which an accessory on which an article is mounted is capable of being mounted in an optimal position.

In an embodiment, a robot includes: a main body which is provided with a traveling wheel, in which an accessory mounting portion and an opening are disposed to be spaced apart from each other, and which has a space therein; a sensor which is accommodated in the space to face the opening so as to sense the outside of the main body through the opening; and at least one accessory comprising a mounter mounted on the accessory mounting portion and a supporter on which an article is supported.

An upper end of the opening may have a height lower than or equal to that of a lower end of the accessory.

A lower end of the accessory mounting portion may have a height higher than a height of each of the upper end of the opening and the lower end of the accessory.

An upper end of the accessory mounting portion may have a height lower than a height of an upper end of the accessory.

A lower end of the opening may have a height higher than a height of a lower end of the main body.

The opening may be closer to a lower end of the main body than an upper end of the main body.

A left-right direction width of the opening may be greater than a left-right direction width of the accessory.

A left-right direction width of the opening may be greater than a left-right direction width of the lower end of the accessory.

the supporter may include: a lower supporter on which a bottom surface of the article is placed; and an upper supporter by which the article is supported.

The lower supporter may face a portion between the opening and the accessory mounting portion of an outer circumferential surface of the main body.

An upper end of the upper supporter may have a height higher than a height of an upper end of the accessory mounting portion.

The robot may further include a foot supporter disposed on a front lower portion of the main body.

The opening may be opened from a rear wall of the main body in a front-rear direction.

The accessory mounting portion may be disposed on a rear wall of the main body at a position that is higher than a position of the opening.

The robot may further include a front sensor disposed on the foot supporter.

The robot may further include: a seating body disposed above the main body; and a front sensor provided on the seating body. The robot may further include a steering provided on the seating body.

A maximum horizontal width of the accessory may be less than a horizontal width of the main body.

In another embodiment, a robot includes: a main body which is provided with a traveling wheel, in which an accessory mounting portion and an opening are disposed to be spaced apart from each other, and which has a space therein; a foot supporter disposed on a front lower portion of the main body; a seating body disposed above the main body; a sensor which is accommodated in the space to face the opening so as to sense the outside of the main body through the opening; a front sensor provided on the foot supporter or the seating body; and at least one rear accessory provided with a mounter mounted on the accessory mounting portion and a supporter on which an article is supported, wherein a lower end of the rear accessory faces an outer surface of the main body in a horizontal direction and faces an upper portion of an upper end of the opening or the upper end of the opening.

A lower end of the accessory mounting portion may have a height higher than a height of each of the upper end of the opening and the lower end of the accessory.

An upper end of the accessory mounting portion may have a height lower than a height of an upper end of the accessory.

The supporter may include: a lower supporter on which a bottom surface of the article is placed; and an upper supporter by which the article is supported.

The lower supporter may face a portion between the opening and the accessory mounting portion of an outer circumferential surface of the main body.

A horizontal width of the opening may be less than a maximum horizontal width of the main body, and the horizontal width of the opening may be greater than a maximum horizontal width of the accessory.

In further another embodiment, a robot includes: a main body which is provided with a traveling wheel, in which an accessory mounting portion and an opening are disposed to be spaced apart from each other, and which has a space therein; a sensor which is accommodated in the space to face the opening so as to sense an outside of the main body through the opening; and a plurality of accessories comprising a mounter mounted on the accessory mounting portion and a supporter on which an article is supported, the plurality of accessories having different outer appearances and sizes, wherein the plurality of accessories are selectively mounted on the accessory mounting portion, and the accessory mounting portion is disposed at a height at which the accessories mounted on the accessory mounting portion do not overlap the opening in a horizontal direction.

The details of one or more implementations are set forth in the accompanying drawings and the description below. Other features will be apparent from the description and drawings, and from the claims.

DETAILED DESCRIPTION OF THE EMBODIMENTS

Figure 1:
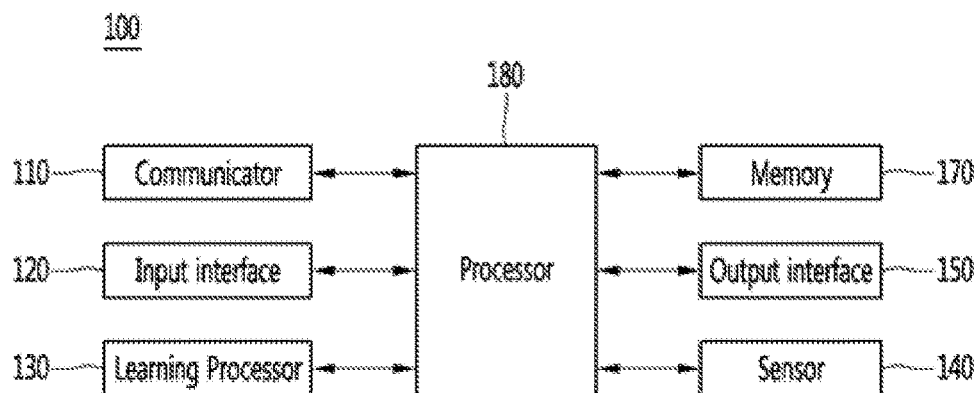
FIG. 1 is a view illustrating an AI device constituting a robot system according to an embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input interface 120, a learning processor 130, a sensor 140, an output interface 150, a memory 170, and a processor 180.

The communicator 110 may transmit and receive data to and from external devices such as other AI devices 100a to 100e and the AI server 500 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
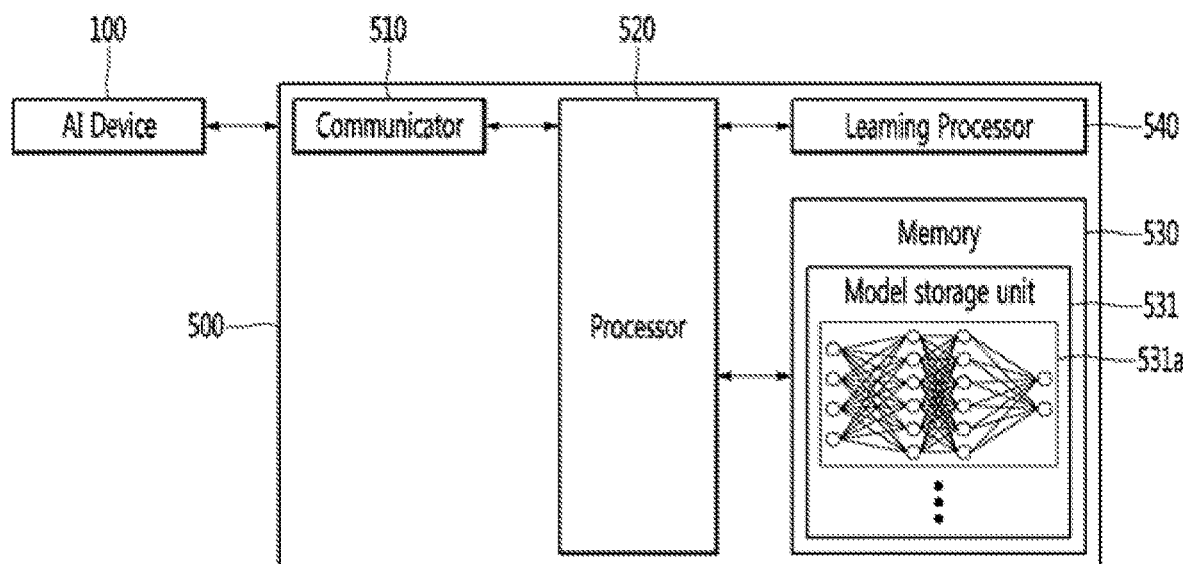
FIG. 2 is a view illustrating an AI server of a robot system according to an embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communicator 510, a memory 530, a learning processor 540, a processor 520, and the like.

The communicator 510 can transmit and receive data to and from an external device such as the AI device 100.

The memory 530 may include a model storage unit 531. The model storage unit 531 may store a learning or learned model (or an artificial neural network 531*a*) through the learning processor 540.

The learning processor 540 may learn the artificial neural network 531*a* by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
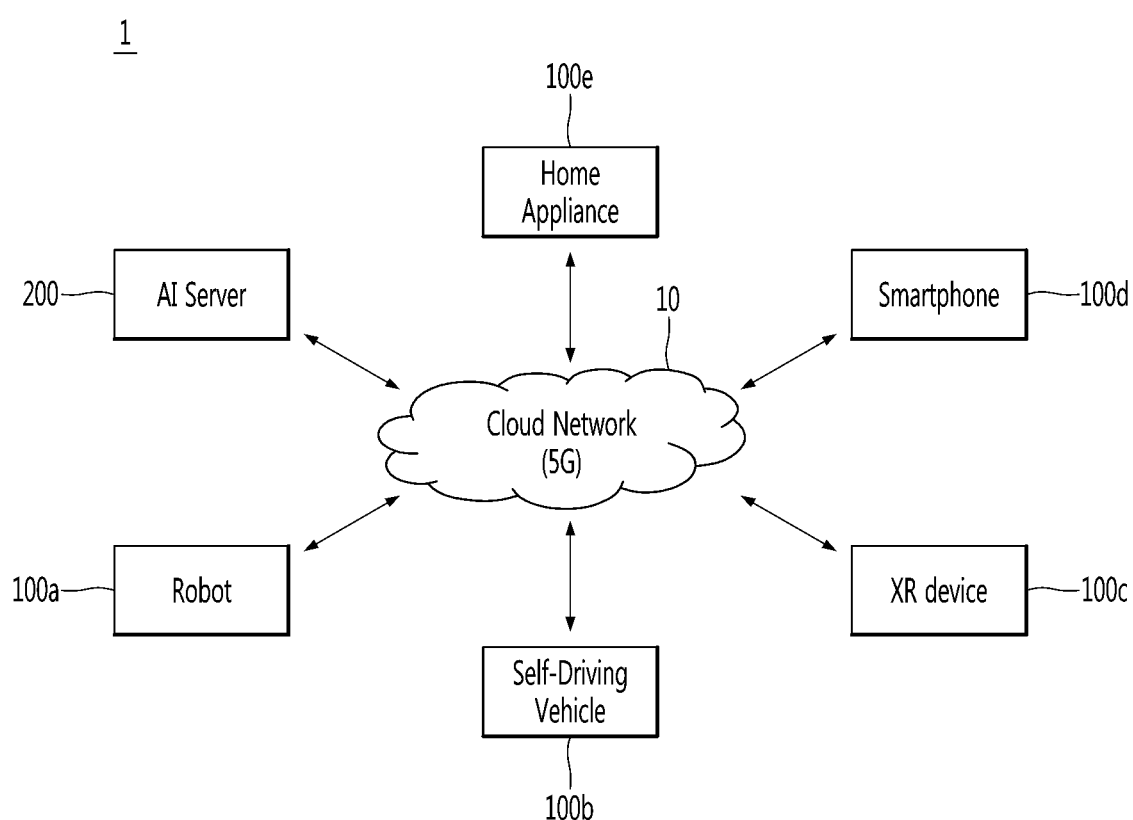
FIG. 3 is a view illustrating an AI system to which a robot system according to an embodiment is applied.

FIG. 3 illustrates an AI system 1 according to an embodiment of the present invention.

Referring to FIG. 3, in the AI system 1, at least one of an AI server 500, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 500 configuring the AI system 1 may be connected to each other through the cloud network 10. In particular, each of the devices 100*a* to 100*e* and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 500 may learn the artificial neural network according to the machine learning algorithm instead of the AI devices 100*a* to 100*e*, and may directly store the learning model or transmit the learning model to the AI devices 100*a* to 100*e*.

At this time, the AI server 500 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1. <AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model provided as at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 500.

At this time, the robot 100*a* may perform the operation by generating the result by directly using the learning model, but the sensor information may be transmitted to the external device such as the AI server 500 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Hereinafter, the robot 100a will be described as an example of the boarding robot on which the user is capable of boarding.

Figure 4:
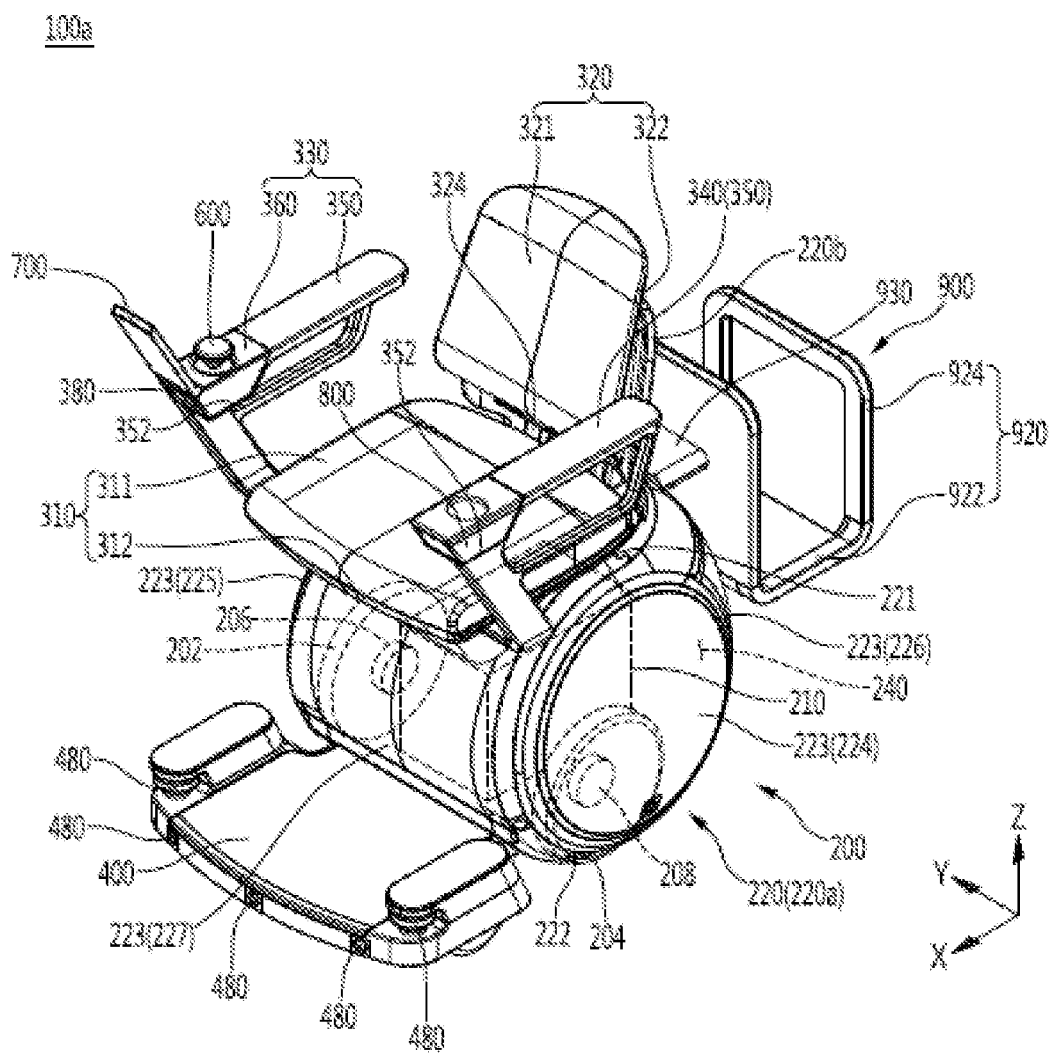
FIG. 4 is a perspective view of a robot according to an embodiment.
Figure 5:
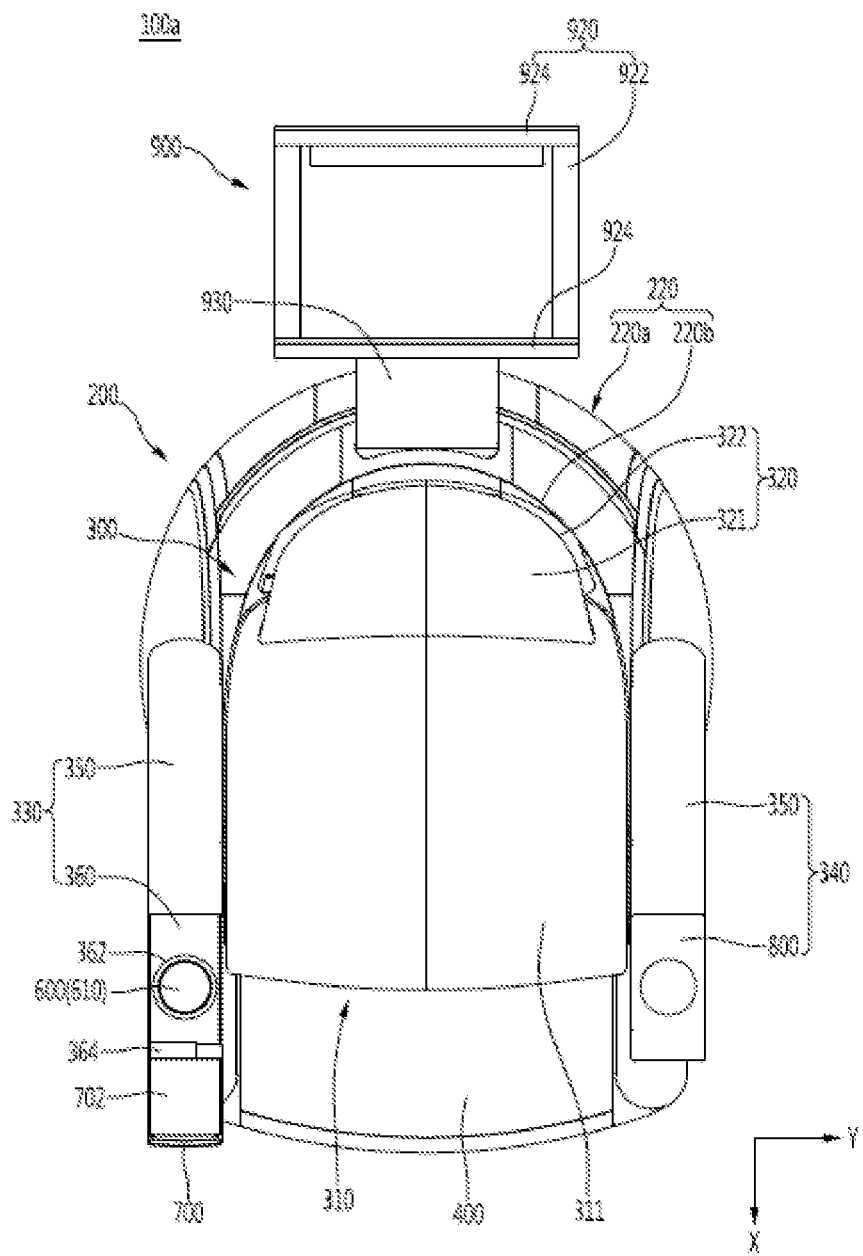
FIG. 5 is a plan view of the robot according to an embodiment.
Figure 6:
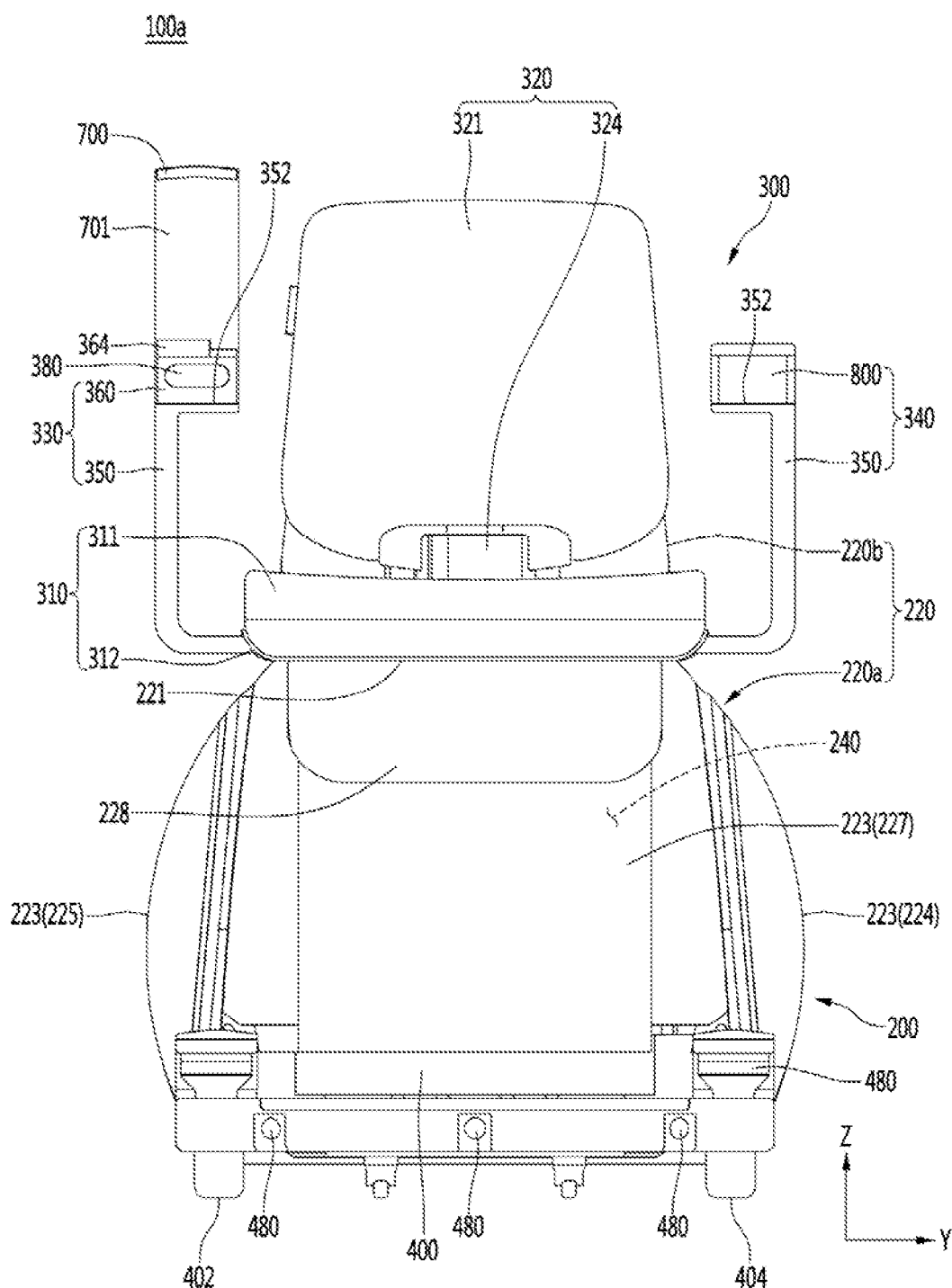
FIG. 6 is a front view of the robot according to an embodiment.
Figure 7:
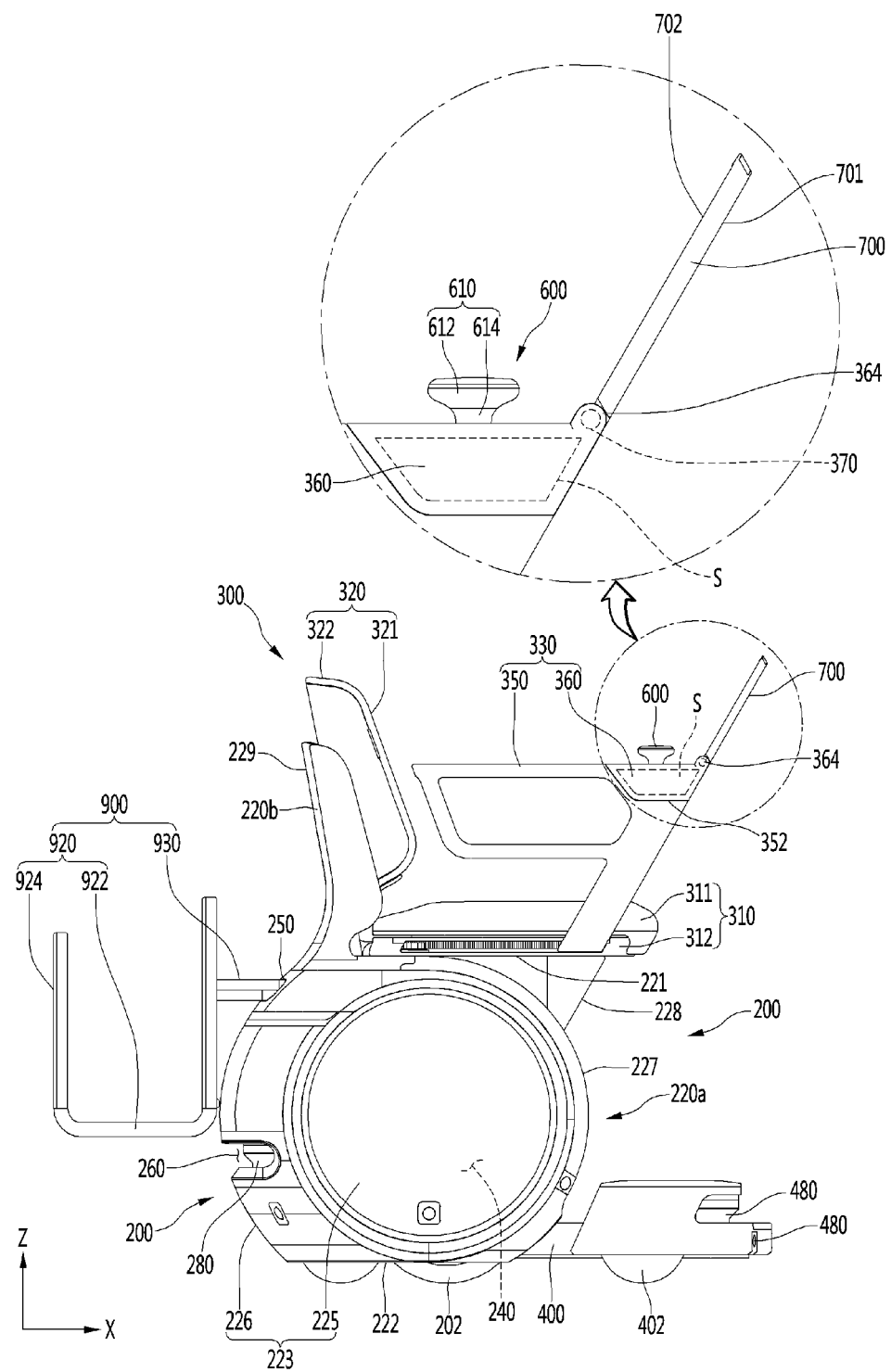
FIG. 7 is a side view of the robot according to an embodiment.

FIG. 4 is a perspective view of a robot according to an embodiment, FIG. 5 is a plan view of the robot according to an embodiment, FIG. 6 is a front view of the robot according to an embodiment, and FIG. 7 is a side view of the robot according to an embodiment.

The robot 100a may include a main body 200.

The main body 200 may include at least one traveling wheel and may be a traveling module or a mobile robot that is capable of traveling according to a user's input or autonomously traveling.

The main body 200 may be an assembly of a plurality of parts, and the main body 200 may further include a driving mechanism (or traveling mechanism) that is connected to the traveling wheel to allow the traveling wheel to rotate forward and backward.

The traveling wheel may be provided in a pair on the main body 200. The pair of traveling wheels 202 and 204 may be provided on the main body 200 so as to be spaced apart from each other in a left-right direction Y.

The driving mechanism may include a traveling motor 206, 208 generating driving force for allowing the traveling wheels 202 and 204 to rotate. In an example of the driving mechanism, the traveling motor 206, 208 may be directly connected to the traveling wheels 202 and 204 so that the traveling wheels 202 and 204 directly rotate forward and backward by the traveling motor 206, 208. In another example of the driving mechanism, the traveling motor 206, 208 may be connected to the traveling wheels 202 and 204 through various power transmission members such as a rotation shaft and gears to allow the traveling wheels 202 and 204 to rotate forward and backward through the power transmission member.

The main body 200 may include a separate steering wheel disposed to be spaced apart from the traveling wheels 202 and 204 so as to switch a traveling direction of the robot 100a. The direction of the steering wheel and the traveling direction of the main body 200 may be determined by a steering 600 that will be described below.

The main body 200 may not include the separate steering wheel for switching the traveling direction of the main body 200, and the traveling direction of the main body 200 may be determined using a pair of traveling wheels 202 and 204. The traveling direction of the main body 200 may be determined using the rotation direction of each of the pair of traveling wheels 202 and 204 or a difference in rotation speed of the pair of traveling wheels 202 and 204.

The main body 200 may be configured to allow the pair of traveling wheels 202 and 204 to rotate independently with respect to each other and include a pair of traveling motors 206 and 208 for allowing the pair of traveling wheels 202 and 204 to rotate. The pair of traveling motors 206 and 208 may include a right traveling motor 206 for allowing the right traveling wheel 202 of the pair of traveling wheels 202 and 204 to rotate and a left traveling motor 208 for allowing the left traveling wheel 204 of the pair of traveling wheels 202 and 204 to rotate.

The main body 200 may further include a battery 210 for supplying power to each component of the robot 100a. The battery 210 may be disposed in the main body 200 in consideration of a center of gravity of the entire robot 100a.

The main body 200 may include a housing 220 defining an outer appearance. The housing 220 may be provided as an assembly of a plurality of members. The housing 220 may include a top surface 221, a bottom surface 222, and a circumferential surface 223.

Each of the top surface 221 and the bottom surface 222 of the housing 220 may have a planar shape, and the circumferential surface 223 of the housing 220 may have a curved shape.

The circumferential surface 223 may include a left surface 224, a right surface 225, a rear surface 226, and a front surface 227.

The left surface 224 may be convex toward a left side, and the right surface 225 may be convex toward a right side. And, the rear surface 226 may be convex toward a rear side between an upper end and a lower end. The front surface 227 may be convex forward between the upper and lower ends.

The upper end of the front surface 227 of the circumferential surface 223 may extend closer to a rear end among a front end of the top surface 221 and the rear end of the top surface 221.

The circumferential surface 223 may further include a plane 228 extending from one side of the convex front surface 227 to the front end of the top surface 221. The plane 228 may be an inclined surface that is inclined to face in a front lower direction.

The housing 220 may further include an upper rear surface 229 extending upward from an upper portion of the convex rear surface 226.

The housing 220 includes a lower housing 220a including a top surface 221, a bottom surface 222, and a circumferential surface 223 and an upper housing 220b extending from one side of the lower housing 220a to protrude upward and including an upper rear surface 229.

The lower housing 220a may be provided in a spherical shape of which each of top and bottom surfaces 221 and 222 are flat as a whole.

The upper housing 220b may extend from a rear upper portion of the lower housing 220a to a rear side of a backrest 320 to be described later.

The traveling wheels 202 and 204 may be rotatably disposed in the housing 220, and a lower portion of each of the traveling wheels 202 and 204 may be disposed in the housing 220 to pass through a wheel through-hole defined in a lower portion of the housing 220.

A space may be defined in the housing 220, and the battery 210 may be accommodated in the space defined in the housing 220.

The robot 100a may further include a seating body 300 disposed above the main body 200 and a foot supporter 400 disposed in front of the main body 200.

The seating body 300 may be configured to allow the user to be seated. The seating body 300 may be provided with a seat for allowing the user to be seated thereon. Also, the seating body 300 may be provided with an armrest for allowing a user's arm to be placed. A height of the armrest may be higher than a height of the seat.

The seating body 300 may further include a seat body 310 on which the user sits and a backrest 320 on which the user leans back.

The seat body 310 may include a lower cushion 311 and a lower seat body 312 on which the lower cushion 311 is mounted.

The lower cushion 311 may be disposed on a top surface of the lower seat body 312. The lower cushion 311 may be provided to be more elastic than the lower seat body 312.

The lower seat body 312 may be disposed on an upper portion of the housing 220, in particular, the lower housing 220a. The lower seat body 312 may cover a space defined in the housing 220.

The seat body 310 may not include the lower cushion 311, but may include the lower seat body 312.

The backrest 320 may include a rear cushion 321 and a rear seat body 322 supporting the rear cushion 321. The rear seat body 322 may be supported by a rear supporter 324, and the backrest 320 may further include the rear supporter 324.

The rear cushion 321 may be disposed on a front surface of the rear seat body 322. The rear cushion 321 may be provided to be more elastic than the rear seat body 322.

The rear seat body 322 may entirely or partially overlap the upper housing 220b in a front-rear direction, and the rear supporter 324 may overlap the upper housing 220b in the front-rear direction. The rear seat body 322 and the rear supporter 324 may be protected by the upper housing 220b.

A lower portion of the rear supporter 324 may be connected to the lower seat body 312. The rear supporter 324 may be configured so that an upper part thereof is bent with respect to the lower part thereof. The lower portion of the rear supporter 324 may be rotatably connected to the lower seat body 312 by a hinge shaft, and the backrest 320 may be disposed to rotate about the lower portion.

The backrest 320 may not include the rear cushion 321, but may include the rear seat body 322 and the rear supporter 324.

The armrest may be disposed in the seat body 310 so as to move forward and backward. The armrest may be provided in a pair on the seating body 300.

The pair of armrests 330 and 340 may include a right armrest 330 and a left armrest 340 and the right armrest 330 and the left armrest 340 may be spaced apart from each other in the left-right direction Y and may be arranged symmetrical to each other in the left-right direction Y.

The pair of armrests 330 and 340 may be disposed on the seat body 310, in particular, the lower seat body 312 so as to move forward and backward, and a lower portion of each of the pair of armrests 330 and 340 may be inserted into the lower seat body 312. The lower portion of each of the pair of armrests 330 and 340 may be guided to move forward and backward in a front-rear direction X along a guide provided on the seat body 310.

The foot supporter 400 may be disposed on the main body 200. The foot supporter 400 may be disposed on the main body 200 to protrude in the front-rear direction. The foot supporter 400 may be disposed at a front lower portion of the main body 200. The foot supporter 400 may be disposed on the main body 200 to move forward and backward in the front-rear direction X.

An auxiliary wheel supporting the foot supporter 400 may be disposed on the foot supporter 400. A pair of auxiliary wheels may be provided on the foot supporter 400, and the pair of auxiliary wheels 402 and 404 may be disposed the foot supporter 400 so as to be spaced apart from each other in a horizontal direction.

The robot 100a may include a steering 600 operated by the user. The steering 600 may be an adjusting device such as a jog & shuttle or a joystick.

The steering 600 may include a handle 612 held by the user. The steering 600 may be an input interface that is held and manipulated by the user's hand to input a traveling direction or traveling speed of the robot 100a.

The steering 600 may be disposed on at least one armrest. The steering 600 may be provided on each of the pair of armrests 330 and 340 and may be disposed on one of the pair of armrests 330 and 340.

The steering 600 may include a steering body 610 that is held by the user's hand. The steering body 610 may be a body which is held by the user's hand so as to be manipulated in various directions such as front, rear, left, and right directions. A handle 612 that is held by the user's hand may be disposed on an upper portion of the steering body 610. The steering body 610 may include a steering shaft 614 extending from a lower portion of the handle 612.

The user may hold the handle 612 while sitting on the seat body 310 to push the steering body 610 forward, pull the steering body 610 backward, or push the steering body to a left or right side.

For example, in the steering body 610, the handle 612 is inclined to one side such as the front, rear, left, or right side with respect to the steering shaft 614. The robot 100a may include a sensor sensing an inclination angle and an inclination direction of the steering body 610. The robot 100a may sense a steering direction or speed by the inclination angle (or inclination angle), the inclination direction, etc. of the steering body 610, which are sensed by the sensor.

For another example, in the steering body 610, the steering shaft 614 and the handle 612 may be disposed to move to the front, rear, left, or right side. The robot 100*a* may include a sensor sensing a position of the steering body 610. The robot 100*a* may sense the steering direction or speed according to the position of the steering body 610, which is sensed by the sensor.

For another example, in the steering body 610, the steering shaft 614 and the handle 612 may be disposed to rotate in a clockwise or counterclockwise direction. The robot 100*a* may include a sensor sensing a rotation angle of the steering body 610. The robot 100*a* may sense the steering direction or speed according to the rotation angle of the steering body 610, which is sensed by the sensor.

The sensor may transmit a signal of the sensed steering direction or speed to a processor 180, and the processor 180 may control the traveling motors 206 and 208 which will be described later according to the signal transmitted from the sensor.

The robot 100*a* may further include a display 700. The display 700 may be disposed on at least one of the pair of armrests 330 and 340. The display 700 may be disposed to rotate about a horizontal rotation center. The display 700 may be an output interface capable of displaying various information such as traveling information.

The display 700 may be rotatably connected to the steering housing 360. The display 700 may be connected to the front end of the steering housing 360.

The display connection portion 364 to which the display 700 is rotatably connected may be provided in the steering housing 360.

The display connection portion 364 may be spaced apart from the steering body 610 in a horizontal direction when the steering body 610 ascends.

The robot 100*a* may further include a display rotator 370 that allows the display 700 to rotate. The display rotator 370 may be a rotating mechanism for allowing the display 700 connected to the display 700 to rotate. The display rotator 370 may include a display motor connected to the display 700 to allow the display 700 to rotate. Hereinafter, for convenience, like the display rotator 370, the display motor will be described with reference numeral 370. The display motor 370 may be disposed to be accommodated in the display connection portion 364. A motor space in which the display motor 370 is accommodated may be defined in the display connection portion 364.

The display motor 370 may be provided with a rotation shaft that allows the display 700 to rotate, and the rotation shaft may be disposed horizontally. The rotation shaft may be lengthily disposed in the left-right direction Y (i.e. horizontal direction). The display motor 370 may allow the display 700 to rotate so that the display 700 is erected about a rotation axis, or the display 700 is laid down.

In this specification, the display 700 is not limited to being vertically erected, but may be defined to include being erected at a predetermined angle.

The display 700 may include a front surface 701 facing a front side and a rear surface 702 facing a rear side with respect to the standing display 700. A screen that is capable of providing a variety of information to the user may be disposed on the rear surface 702 of the display 700. A touch screen may be disposed on the rear surface 702 of the display 700, and the user may input various commands through the touch screen.

The display 700 may rotate side by side with the top surface of the armrest on the armrest. In this case, the front surface 701 when the display 700 is laid horizontally may be a top surface of the display 700, and the rear surface 702 when the display 700 is erected may be a bottom surface of the display 700.

When the display 700 is laid horizontally, the screen of the display 700 is hidden from the outside, and the screen of the display 700 may be protected.

The robot 100*a* may further include at least one accessory that provides convenience to the user.

The accessory may be provided on the armrest or the main body 200, and a plurality of accessories may be provided on the robot 100*a*.

The robot 100*a* may include an accessory 800 (armrest accessory) provided on the armrest. The robot 100*a* may include an accessory 900 provided on the main body 200 (body accessory). The robot 100*a* may include both the accessory 800 provided on the armrest and the accessory 900 provided on the main body 200.

For example, the accessory 800 provided on the armrest may be a cup holder into which a cup is seated. For another example, the accessory 800 provided on the armrest may be a sub armrest having the same size and shape as the steering housing 360 but without an opening 362 defined in an upper portion thereof.

The steering housing 360 according to this embodiment may be selectively disposed on the armrest body 350 of the left armrest 340 or the armrest body 350 of the right armrest 335*r*0 for the convenience of the user. That is, the accessory such as the cup holder or a sub armrest may be disposed on the armrest body 350 of the armrest, in which the steering housing 360 is not disposed, among the left armrest 340 and the right armrest 330 and may support the user's arm together with the armrest body 350.

The accessory 800 provided on the armrest is not limited to the cup holder or the sub armrest, and also is not limited to the kind thereof as long as it provides the user's convenience and is accommodated in the accommodation portion 352.

An opening 362 may be defined in the armrest, and an inner space S in which a portion of the steering 600 is accommodated may be defined in the armrest. When the robot 100*a* includes a pair of armrests 330 and 340, the steering 600 may be disposed on one of the pair of armrests 330 and 340.

At least one of the pair of armrests 330 and 340 may be an assembly of a plurality of members, and at least one of the pair of armrests 330 and 340 may include the armrest body 350 and the steering housing 360.

One of the pair of armrests 330 and 340 330 may include the armrest body 350 and the steering housing 360 disposed on the armrest body 350. An accommodation portion 352 in which the steering housing 360 is accommodated may be defined in the armrest body 350.

The accommodation portion 352 may be provided in a shape that is recessed in the armrest body 350. A top surface of the accommodation portion 352 may be opened. Each of the top and front surfaces of the accommodation portion 352 may be opened.

The steering housing 360 may be inserted into and accommodated in the accommodation portion 352 and may be protected by the accommodation portion 352.

The steering housing 360 may surround at least a portion of the steering 600 and may protect the steering 600.

The other one of the pair of armrests 330 and 340 may include the armrest body 350 and may further include an accessory 800 disposed on the armrest body 350. The armrest body 350 may be provided with the accommodating portion 352 in which the accessory 800 is accommodated.

The pair of armrests 330 and 340 may include the armrest body 350 having the same structure, and the steering housing 360 and the accessory 800 may be disposed symmetrical to each other in the horizontal direction. Each of the pair of armrests 330 and 340 may be provided with the accommodation portions 352 having the same shape and the same size.

The accessory 800 and the steering housing 360 may have the same size and outline shape.

The steering housing 360 and the accessory 800 may have the same shape and size and may be disposed symmetrical to each other with respect to the seating body 300.

The steering housing 360 may constitute a steering assembly together with steering 600. The steering assembly may be selectively disposed together with the accessory 800.

When the steering housing 360 is disposed on the armrest body 350 of the right armrest 330, the accessory 800 may be disposed on the armrest body 350 of the left armrest 340, and vice versa. When the steering housing 360 is disposed on the armrest body 350 of the left armrest 340, the accessory 800 may be disposed on the armrest body 350 of the right armrest 330.

For example, the accessory 900 provided on the main body 200 may be a supporter on which a user's baggage (e.g., a carrier) is placed. For another example, the accessory 900 provided on the main body 200 may be a supporter on which a medical device (e.g., crutches, medicines, etc.) assisting user's walk is supported. The accessory 900 provided on the main body 200 is not limited to the supporter, and also, the accessory 900 is not limited in kind as long as the accessory 900 moves with the user. Various kinds of accessories 900 may be separably attached to the main body 200.

The robot 100a may include a sensor 140, and the sensor 140 may include at least one sensor for autonomous driving, driving assistance, or safety.

The sensor 140 may include a rear sensor 280 capable of sensing a rear side and a rear periphery of the robot 100a. For example, the rear sensor 280 may be a lidar sensor that senses an object using a wavelength of light. The rear sensor 280 is not limited to the lidar sensor and may be configured as a radar sensor for sensing an object using electromagnetic waves or an ultrasonic sensor for sensing an object using ultrasonic waves.

The rear sensor 280 may be disposed at a rear side of the robot 100a. The rear side of the robot 100a may be defined between a center of the robot 100a and a rear end of the robot 100a in the front-rear direction X of the robot 100a. Hereinafter, the rear sensor 280 will be described as a sensor 280.

A plurality of sensors 140 may be provided on the robot 100a. The sensor 140 may include at least one front sensor 380 and 480 capable of sensing the front side and the front periphery of the robot 100a.

The front sensors 380 and 480 may be disposed in front of the robot 100a. The front part of the robot 100a may be defined between the center of the robot 100a and the front end of the robot 100a in the front-rear direction X of the robot 100a.

The front sensors 380 and 480 may be provided on the seating body 300 or the foot supporter 400.

For example, the front sensors 380 and 480 may be a lidar sensor that senses an object using a wavelength of light. The rear sensor 280 is not limited to the lidar sensor and may be configured as a radar sensor for sensing an object using electromagnetic waves or an ultrasonic sensor for sensing an object using ultrasonic waves.

A plurality of front sensors 380 and 480 may be provided on the robot 100a, and the plurality of front sensors 380 and 480 may be disposed at different heights. The plurality of front sensors 380 and 480 may include a front sensor 380 provided on the seating body 300 and a front sensor 480 disposed on the foot supporter 400.

The plurality of front sensors 380 and 480 may be configured by a combination of a lidar sensor, a radar sensor, and an ultrasonic sensor.

A height of the front sensor 380 provided on the seating body 300 may be higher than a height of the front sensor 480 disposed on the foot supporter 400, and the front sensor 380 provided on the seating body 300 may be a front upper sensor. The front sensor 480 disposed on the foot supporter 400 may be a front lower sensor.

The accessory 900 is preferably mounted so as not to disturb the sensing of the sensor 140. That is, the accessory 900 is preferably disposed outside a sensing area of the sensor 140, it is preferably mounted so as not to directly overlap the sensor 140.

At least one accessory 900 may be mounted on the main body 200.

A space 240 may be defined in the main body 200. An accessory mounting portion 250 on which the accessory 900 is capable of being separably mounted may be disposed on the main body 200. An opening 260 spaced apart from the accessory mounting portion 250 may be defined in the main body 200.

A lower end of the accessory 900 may face an outer surface of the main body 200 in a horizontal direction and may face an upper end of the opening 260 or an upper end of the opening 260.

The accessory mounting portion 250 may be disposed higher than the opening 260 on a rear wall of the main body 200. The opening 260 may be defined to be opened in the front-rear direction X on the rear wall of the main body 200. The rear wall of the main body 200 may be defined as a portion that is disposed at a rear side in a center of the front-rear direction X of the main body 200 when the main body 200 is divided in the front-rear direction based on the center of the front-rear direction X of the main body 200.

The sensor 280 may be accommodated toward the opening 260 in the space 240, and the sensor 280 may sense the outside of the main body 200 through the opening 260. The opening 260 may function as a sensing hole to help the sensing of an obstacle through the sensor 280.

The accessory 900 may include a supporter 920 on which an article is mounted. The accessory 900 may include a mounter 930 mounted to the accessory mounting portion 250.

The supporter 920 may include a lower supporter 922 on which a lower surface of the article is placed, and an upper supporter 924 on which the article is supported.

The lower supporter 922 may face a portion between the accessory mounting portion 250 and the opening 260 of an outer circumferential surface 223 of the main body 200.

The lower supporter 922 may include a pair of lower bodies spaced apart from each other in the left-right direction Y.

The upper supporter 924 may include a rear upper supporter connecting rear portions of the pair of lower bodies to each other and a front upper supporter connecting front portions of the pair of lower bodies to each other.

The accessory mounting portion 250 may be disposed at a height at which the accessory 900 mounted on the accessory mounting portion 250 does not overlap the opening 260 in the horizontal direction.

The accessory mounting portion 250 may be disposed so that the whole or a portion of the mounter 930 is inserted into the main body 200.

In the robot, a plurality of accessories 900 including a supporter 920 and a mounter 930 may be selectively mounted on the robot mounting portion 250. Some of the plurality of accessories, which are mounted on the accessory mounting portion 250, may have different outer appearances and sizes, and when mounted on the accessory mounting portion 250, heights of upper ends thereof may also be different from each other.

The robot 100a may preferably determine the height of the accessory mounting portion 250 in consideration of each of the plurality of accessories mounted on the accessory mounting portion 250.

Figure 8:
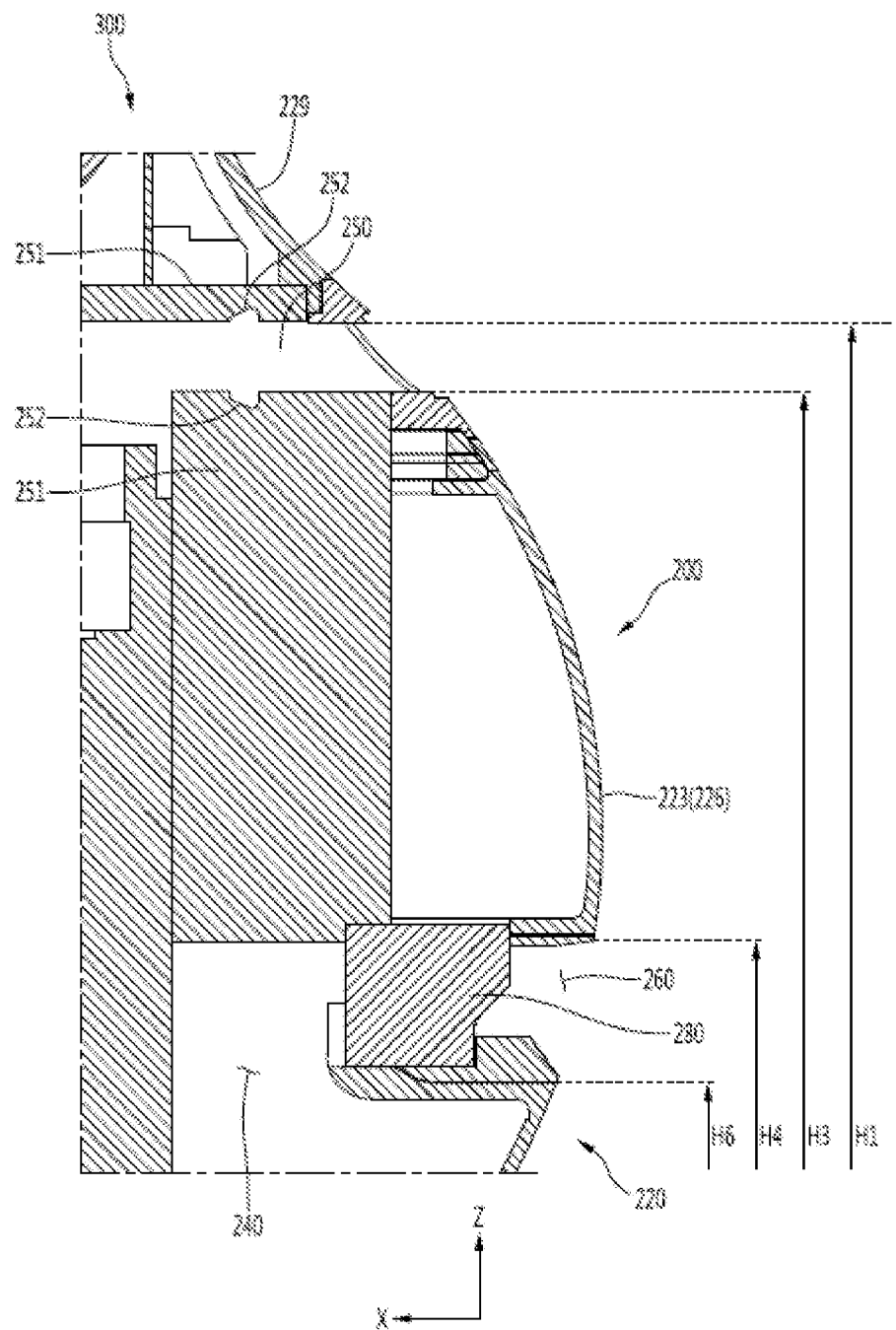
FIG. 8 is a cross-sectional view of an accessory mounting portion of the robot according to an embodiment.
Figure 9:
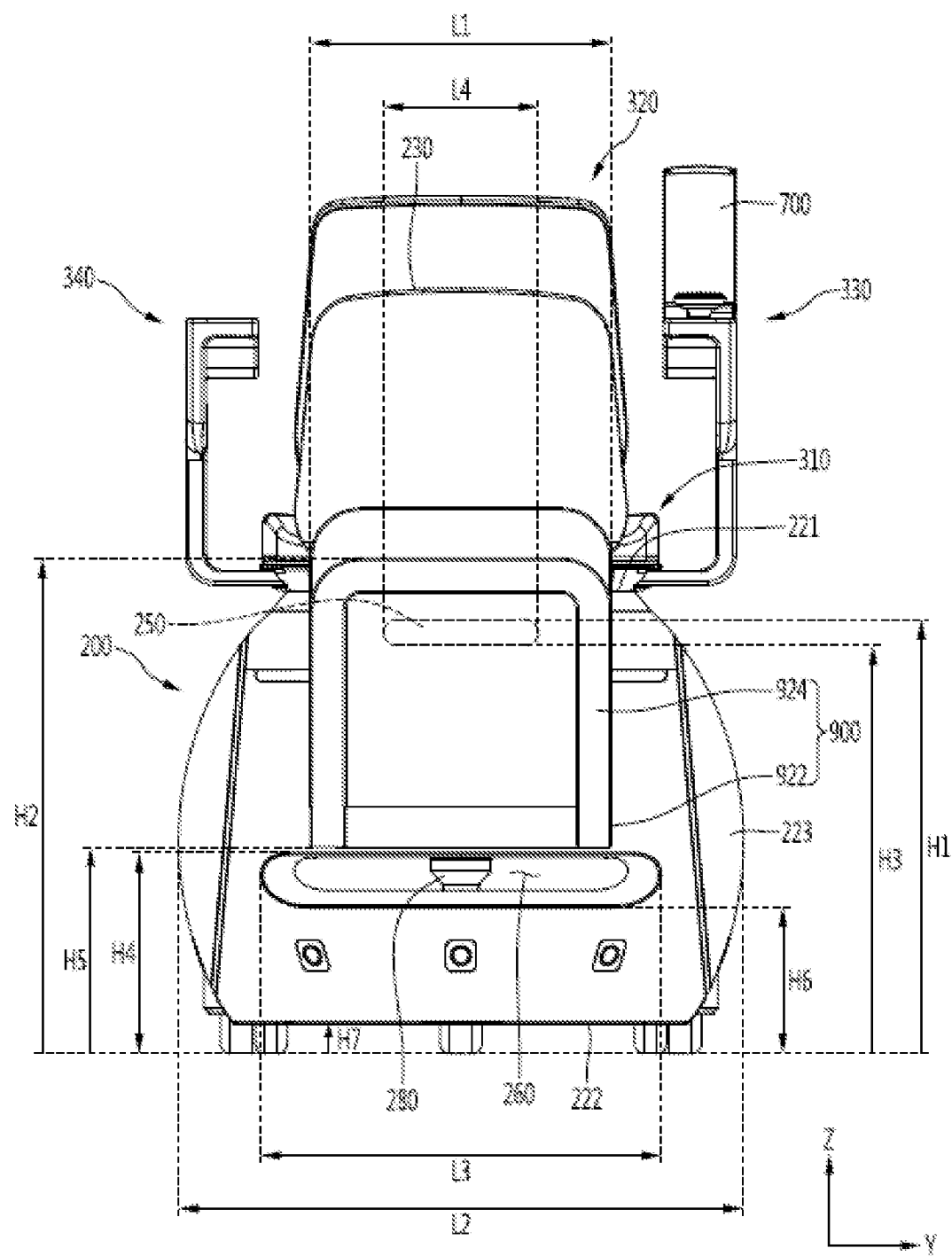
FIG. 9 is a rear view of the robot according to an embodiment.

FIG. 8 is a cross-sectional view of the accessory mounting portion of the robot according to an embodiment, and FIG. 9 is a rear view of the robot according to an embodiment.

The accessory mounting portion 250 may be defined to be opened in the mounting direction (for example, front-rear direction X, or longitudinal direction) of the accessory 900 in the rear portion of the main body 200 and may have a shape that passes through a portion of the main body 200. The accessory mounting portion 250 may have a length in which a portion of the mounter 930 is capable of being inserted.

The accessory 900 may move forward in a state of being disposed behind the main body 200 so that the mounter 930 is inserted into the accessory mounting portion 250.

The main body 200 may be provided with a hook groove 252 into which a locking body provided in the mounter 930 is inserted.

The hook groove 252 may be defined to face the accessory mounting portion 250. The hook groove 252 may be defined in a position at which the locking body reaches when the mounter 930 is inserted into the accessory mounting portion 250. The locking body of the accessory 900 may be inserted into the accessory mounting portion 250 together with the mounter 930, and the locking body of the accessory 900 may be inserted into the accessory mounting portion 250, and then the hook groove 252 may be defined. When reaches the position, the locking body may be inserted into the hook grove 252.

An inner body 251 may be disposed inside the main body 200, and the accessory mounting portion 250 and the hook groove 252 may be defined in the inner body 251. The inner body 251 may be provided as one member or may be composed of a plurality of members.

The accessory mounting portion 250 may be defined to pass through the inner body 251 in a horizontal direction, and the hook groove 252 may be defined to have a recessed shape in the surface defining the accessory mounting portion 250 of the inner body 251.

The portion inserted into the accessory mounting portion 250 of the mounter 930 may be supported by being in contact with the inner body 251 defining the accessory mounting portion 250 of the main body 200, and the locking body disposed in the mounter 930 may extend from the accessory mounting portion 250 to the hook groove 252 and then be hooked with the hook groove 252.

A plurality of hook grooves 252 may be provided, and at least one pair of hook grooves 232 may be provided. The hook groove 252 may include an upper hook groove and a lower hook groove. The upper hook groove may be defined in a surface of the inner body 251 facing a top surface of the mounter 930 and may be defined in a shape that is recessed upward. The lower hook groove may be defined in a surface of the inner body 251 facing a bottom surface of the mounter 930 and may be defined in a shape that is recessed downward.

The opening 260 may be defined lower than the accessory mounting portion 250 in the rear wall of the main body 200.

The opening 260 may be defined to be opened in the mounting direction (for example, front-rear direction X) of the accessory 900 in the rear portion of the main body 200 and may have a shape that passes through a portion of the main body 200. The opening 260 may be defined to pass through the main body 200 from the outer circumferential surface 233 of the main body 200.

A maximum left-right direction width L1 of the accessory 900 may be less than a left-right direction width L2 of the main body 200. The left-right width L2 of the main body 200 may be a maximum width of the main body 200 in the left-right directions Y.

A height H1 of an upper end of the accessory mounting portion 250 may be less than a height H2 of an upper end of the accessory 900 mounted on the accessory mounting portion 250.

A height H3 of a lower end of the accessory mounting portion 250 may be greater than each of a height H4 of a lower end of the opening 260 and a height H5 of a lower end of the accessory 900.

The height H4 of the upper end of the opening 260 may be less than the height H5 of the lower end of the accessory 900 or may be the same as the height H5 of the lower end of the accessory 900.

A height H6 of a lower end of the opening 260 may be greater than a height H7 of a lower end 222 of the body 200.

The opening 260 may be closer to the lower end 222 of the main body 200 than the upper end 230 of the main body 200.

A horizontal width L3 of the opening 260 may be greater than a horizontal width L4 of the accessory mounting portion 250. The opening 260 may be lengthily defined in the left-right direction in the main body 200, and a left-right width L3 of the opening 260 may be less than a left-right maximum width L2 of the main body 200. A left-right width L3 of the opening 260 may be greater than a left-right width L1 of the lower end of the accessory 900.

A height of an upper end of the upper supporter 924 may be greater than a height H3 of an upper end of the accessory mounting portion 250. The height of the upper end of the upper supporter 924 may be the height H2 of the upper end of the accessory 900 and may be greater than the height H3 of the upper end of the accessory mounting portion 250.

Figure 10:
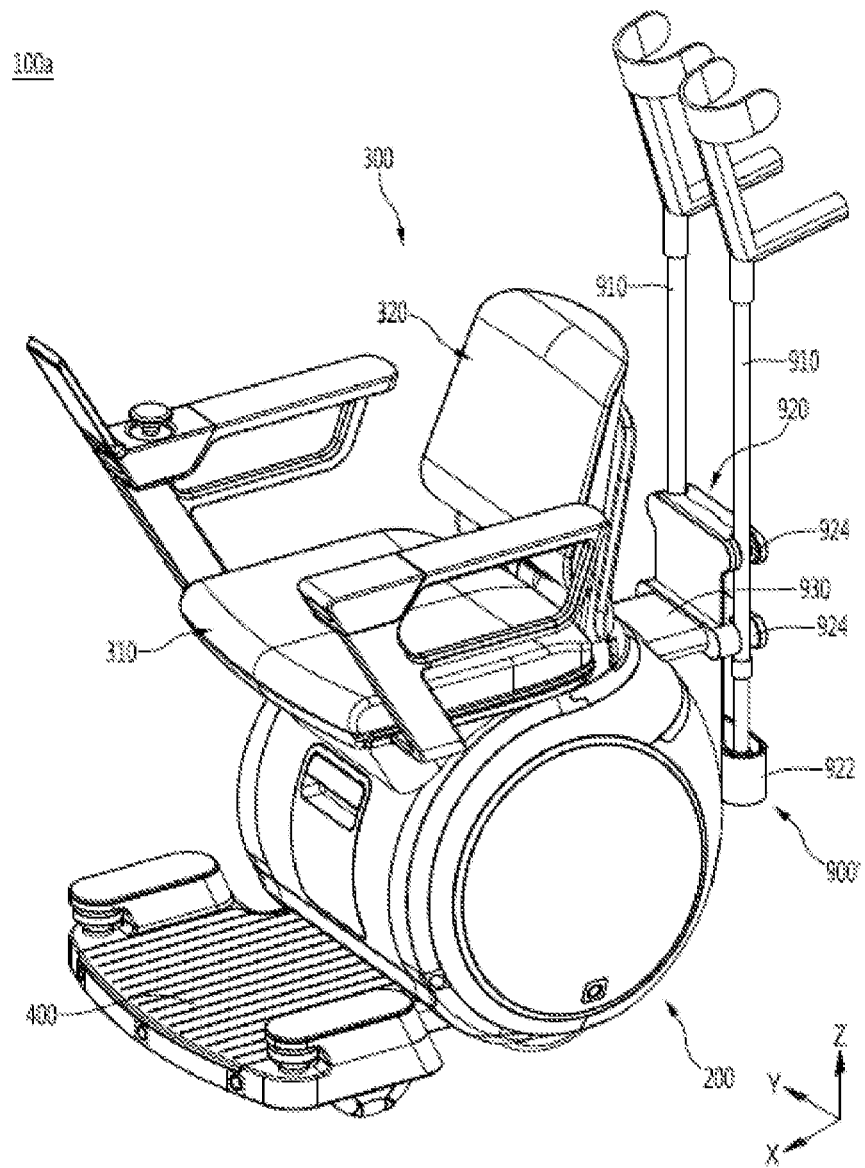
FIG. 10 is a perspective view illustrating another example of the accessory according to an embodiment.
Figure 11:
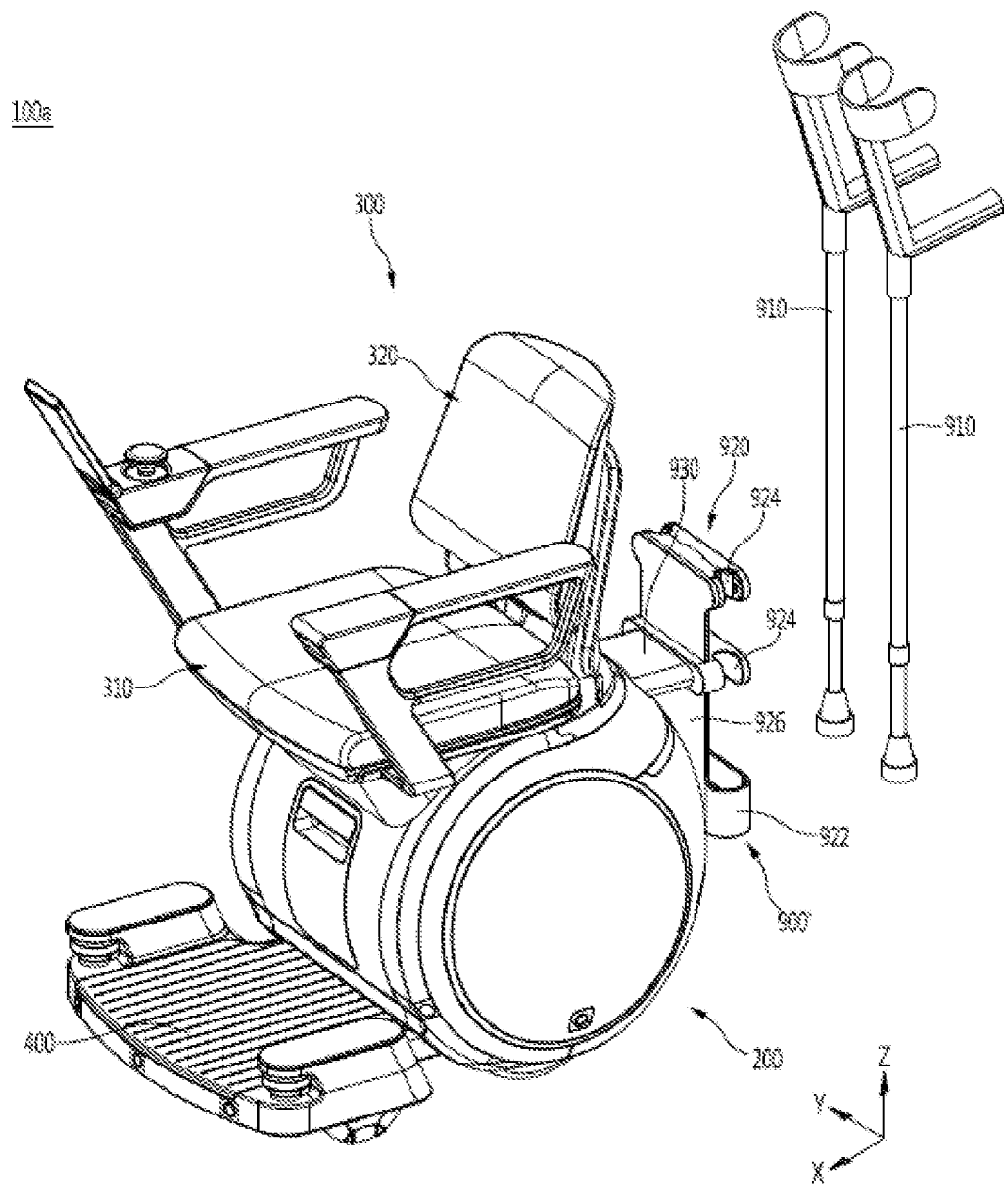
FIG. 11 is a perspective view when an article is supported on the accessory of FIG. 10.
Figure 12:
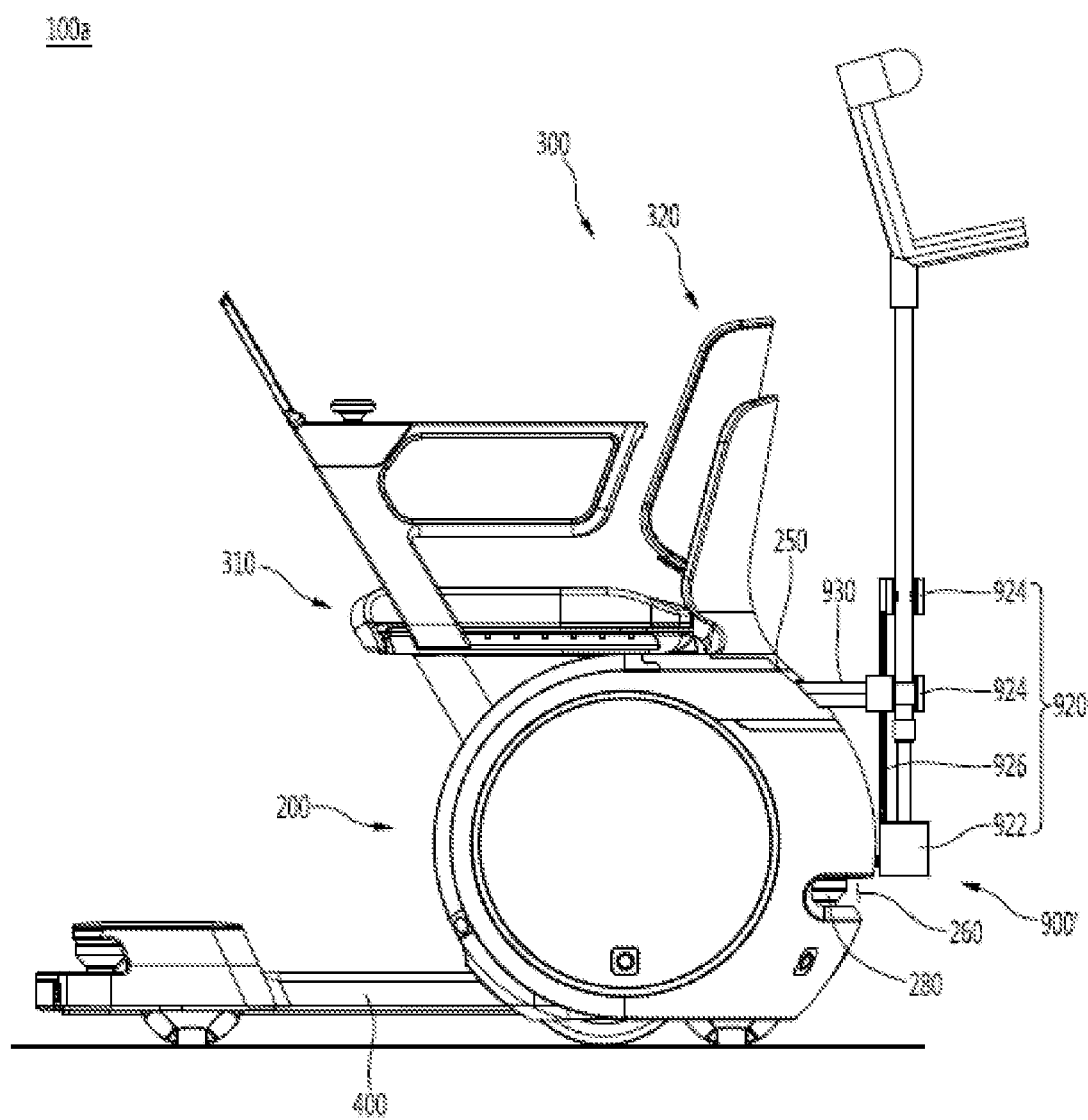
FIG. 12 is a side view illustrating another example of the accessory according to an embodiment.
Figure 13:
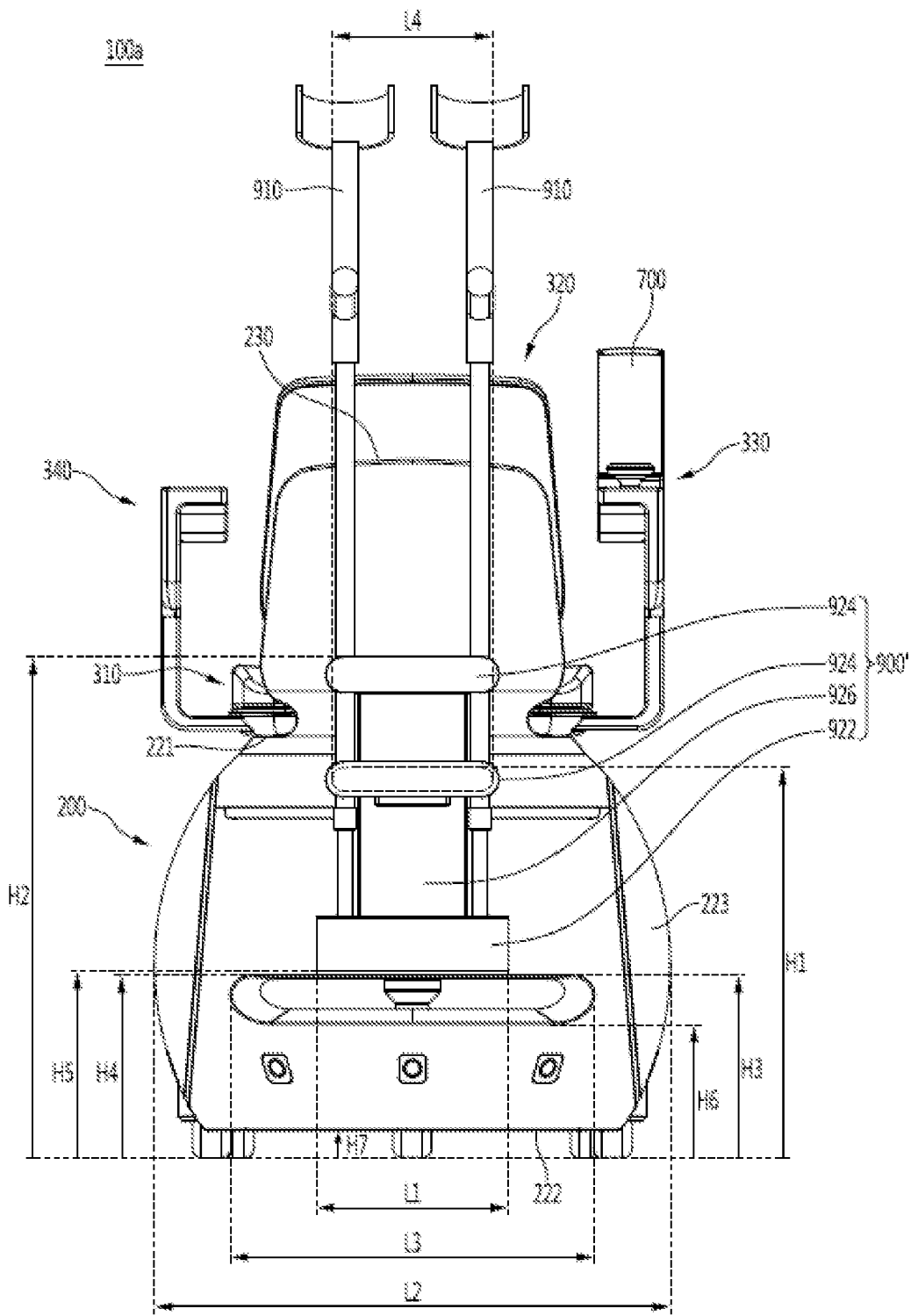
FIG. 13 is a rear view illustrating another example of the accessory according to an embodiment.

FIG. 10 is a perspective view illustrating another example of the accessory according to an embodiment, FIG. 11 is a perspective view when an article is supported on the accessory of FIG. 10, FIG. 12 is a side view illustrating another example of the accessory according to an embodiment, and FIG. 13 is a rear view illustrating another example of the accessory according to an embodiment.

An accessory 900' illustrated in FIGS. 10 to 13 is different in size and shape from the accessory 900 illustrated in FIGS. 4, 5, 7, and 9, and each of the lower supporter 922 and the upper supporter 924 constituting the supporter 920 may have the same function as the accessory 900 illustrated in FIGS. 4, 5, 7, and 9 and include the same mounter 930 as the accessory 900 illustrated in FIGS. 4, 5, 7, and 9.

The accessory 900' illustrated in FIGS. 10 to 13 may further include a support plate 926 connecting the lower supporter 922 to the upper supporter 924, and the lower supporter 922 and the upper supporter 924 may be spaced apart from each other in a longitudinal direction of the accessory 900'. The accessory 900' may be elongated in a vertical direction Z, and the lower supporter 922 and the upper supporter 924 may be spaced apart from each other in the vertical direction Z.

An article 910 mounted on the accessory 900' illustrated in FIGS. 10 to 13 may be a clothing device that is capable of assisting the user's walk. For example, it may be a crutch used under the user's armpit, worn on the arm, or held by the hand, walking aid for assisting a person with a traffic weak to walk, a medicine holder for hanging a medicine on, and the like.

Other configurations and functions except for the size and shape of the accessory 900' may be equal or similar to those of the robot 100a illustrated in FIGS. 4 to 10 and the accessory 900 illustrated in FIGS. 4, 5, 7 and 9, and thus, the same reference numerals are used and detailed description thereof will be omitted.

Like the accessory 900' illustrated in FIGS. 4, 5, 7, and 9, the accessory 900' illustrated in FIGS. 10 to 13 may also not overlap the opening 260 in the horizontal direction, in particular, in the front-rear direction X, and the sensor 280 disposed on the main body 200 may reliably sense an external obstacle through the opening without being disturbed by the accessory 900'.

According to an embodiment, the height of the upper end of the opening facing the sensor may be less than the height of the lower end of the accessory, and thus, the accessory may not overlap the opening, and the sensor may reliably sense the outside through the opening.

In addition, the accessory mounting portion may be covered by the accessory to enhance the outer appearance and to minimize the penetration of the foreign substances such as the dust into the accessory mounting portion.

In addition, the accessory on which the article is mounted may be mounted to avoid the foot supporter, the seating body, and the opening. Therefore, the accessory may be mounted at the optimum position in consideration of the foot supporter, the seating body, and the sensor, and the convenience in use of the robot may be high.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot, comprising:
   a main body including:
      a traveling wheel;
      an accessory mounting portion; and
      an opening, the opening being spaced apart from the accessory mounting portion;
   a rear sensor accommodated in the opening and facing a rear of the robot to sense outside of the main body; and
   an accessory including:
      a mounter mounted on the accessory mounting portion; and
      a supporter for supporting an article,
   wherein an upper end of the opening has a height lower than or equal to a lower end of the accessory,
   wherein a width of the opening is greater than a width of the accessory, and
   wherein a maximum horizontal width of the accessory is less than a horizontal width of the main body.

2. The robot according to claim 1, wherein a lower end of the accessory mounting portion has a height higher than a height of each of the upper end of the opening and the lower end of the accessory.

3. The robot according to claim 1, wherein an upper end of the accessory mounting portion has a height lower than a height of an upper end of the accessory.

4. The robot according to claim 1, wherein the supporter comprises:
   a lower supporter for supporting a bottom surface of the article; and
   an upper supporter for supporting an upper portion of the article, the upper supporter being connected to the lower supporter.

5. The robot according to claim 4, wherein the main body includes a top surface, a bottom surface, and a circumferential surface, and
   wherein the lower supporter faces a portion of the outer circumferential surface of the main body between the opening and the accessory mounting portion.

6. The robot according to claim 1, wherein the main body includes a top surface, a bottom surface, and a circumferential surface,
   wherein the circumferential surface of the main body includes a rear wall,
   wherein the robot further comprises a foot supporter disposed on a front lower portion of the circumferential surface of the main body, and
   wherein the opening protrudes from the rear wall of the main body in a longitudinal direction.

7. The robot according to claim 6, wherein the top surface of the main body is above the accessory mounting portion and the opening.

8. The robot according to claim 6, wherein the top surface of the main body is planar, and
   wherein the bottom surface of the main body is planar.

9. The robot according to claim 6, further comprising a first front sensor disposed on the foot supporter.

10. The robot according to claim 9, further comprising:
    a seating body disposed above the main body; and
    a second front sensor disposed on the seating body.

11. The robot according to claim 10, wherein the seating body includes a first armrest and a second armrest, and
    wherein one of the first armrest and the second armrest includes the second front sensor.

12. The robot according to claim 11, wherein the first armrest includes a display configured to display traveling information of the robot,
    wherein the display is rotatably connected to the first armrest, and
    wherein the first armrest includes the second front sensor.

13. The robot according to claim 12, further comprising a steering provided on the first armrest, and
    wherein the steering is configured to control the traveling wheel to steer the robot.

14. A robot, comprising:
    a main body including:
       a traveling wheel;
       an accessory mounting portion; and an opening, the opening being spaced apart from the accessory mounting portion;

a foot supporter disposed on the main body;

a seating body disposed above the main body;

a rear sensor accommodated in the opening and facing a rear of the robot to sense outside of the main body;

a first front sensor provided on the foot supporter or the seating body; and a rear accessory including:
- a mounter mounted on the accessory mounting portion; and
- a supporter for supporting an article, wherein a lower end of the rear accessory faces an outer surface of the main body in a longitudinal direction and faces an upper end of the opening, wherein a width of the opening is greater than a width of the rear accessory, and wherein a maximum horizontal width of the accessory is less than a horizontal width of the main body.

15. The robot according to claim 14, wherein a lower end of the accessory mounting portion has a height higher than a height of each of the upper end of the opening and the lower end of the rear accessory, and wherein an upper end of the accessory mounting portion has a height lower than a height of an upper end of the rear accessory.

16. The robot according to claim 14, wherein the supporter comprises:

a lower supporter for supporting a bottom surface of the article; and an upper supporter for supporting an upper portion of the article, the upper supporter being connected to the lower supporter.

17. The robot according to claim 14, wherein the seating body includes a first armrest and a second armrest, and wherein the first armrest includes a second front sensor.

18. The robot according to claim 14, wherein the first armrest further includes a display configured to display traveling information of the robot, wherein the display is spaced apart from the second front sensor, and wherein the display is rotatably connected to the first armrest.

19. The robot according to claim 14, wherein the main body includes a top surface, a bottom surface, and a circumferential surface, wherein the circumferential surface of the main body includes a rear wall, wherein the foot supporter is disposed on a front lower portion of the circumferential surface of the main body, and wherein the opening protrudes from the rear wall of the main body in the longitudinal direction.

* * * * *